INVENTOR
KURT H. HOPPMANN
BY Semmes & Semmes
ATTORNEYS

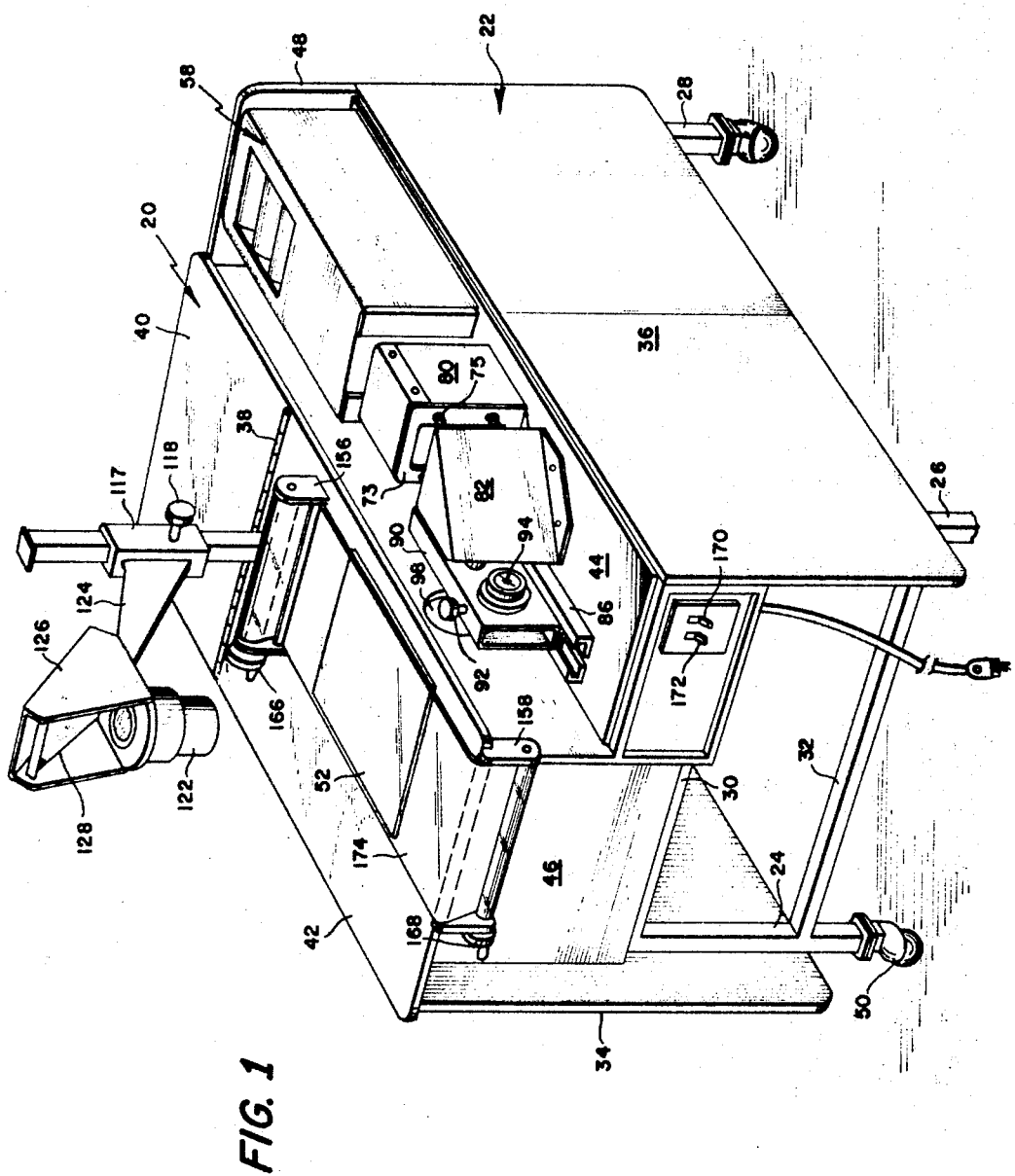

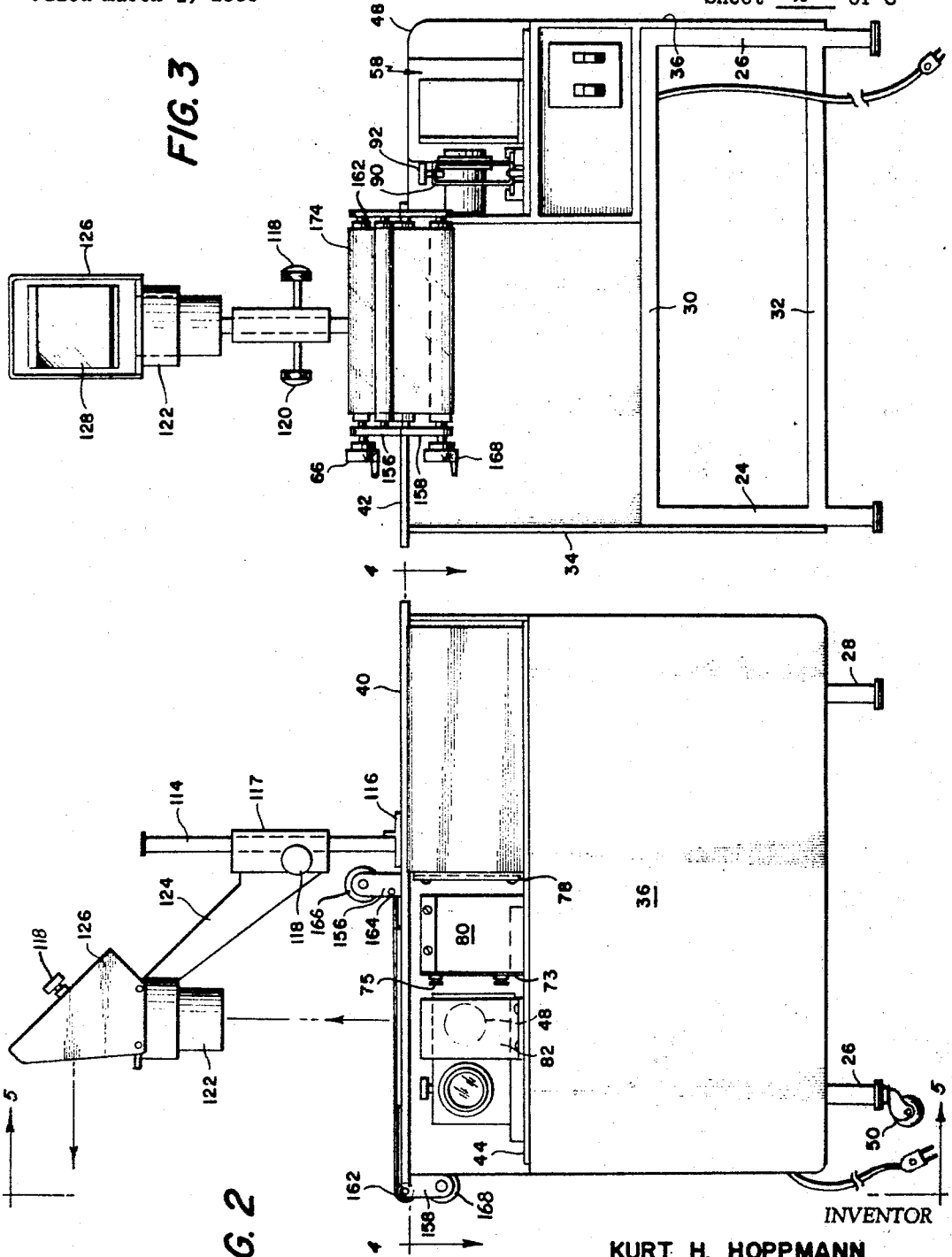

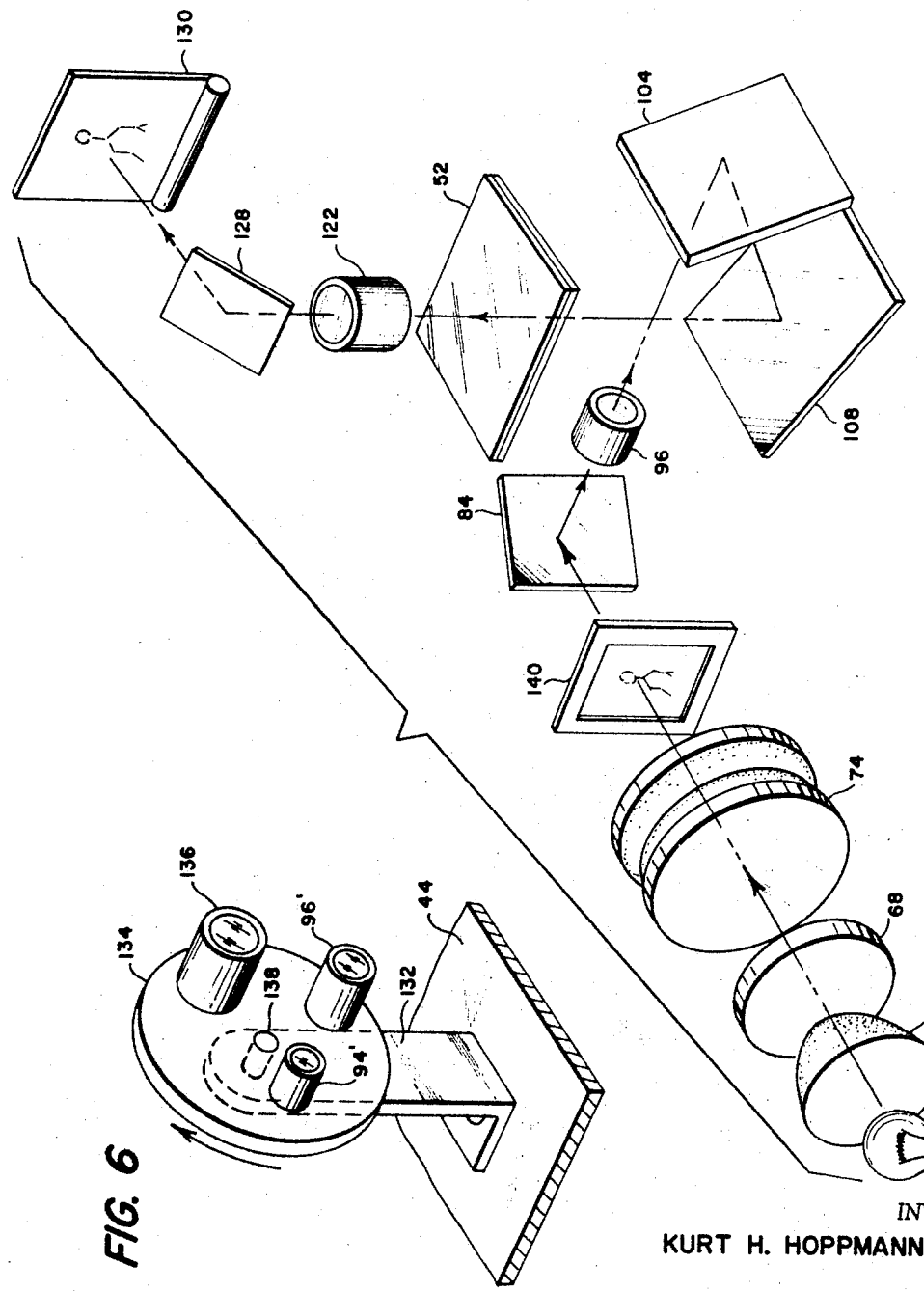

FIG. 8
FIG. 9
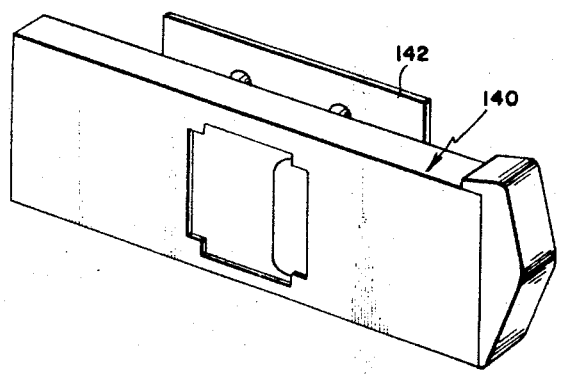
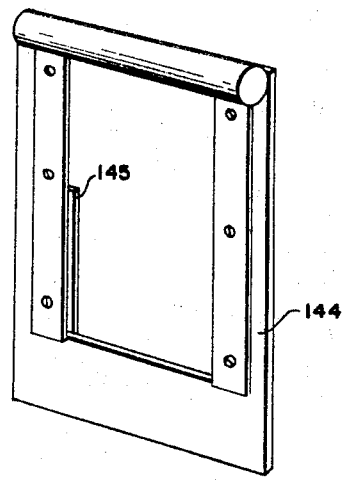
FIG. 10
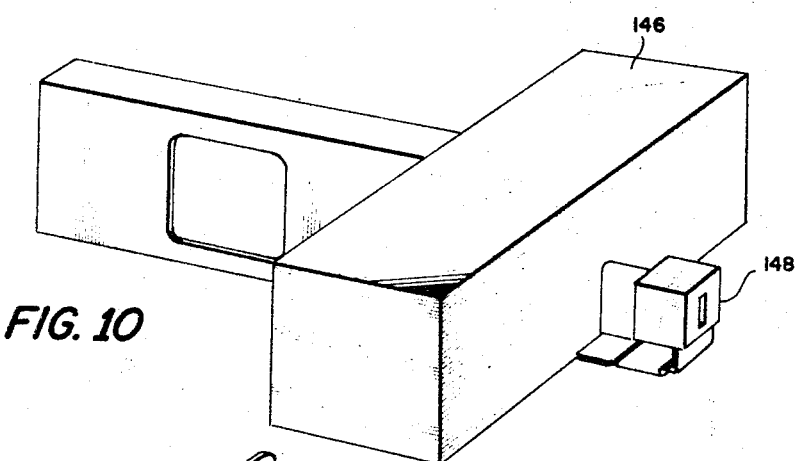
FIG. 11
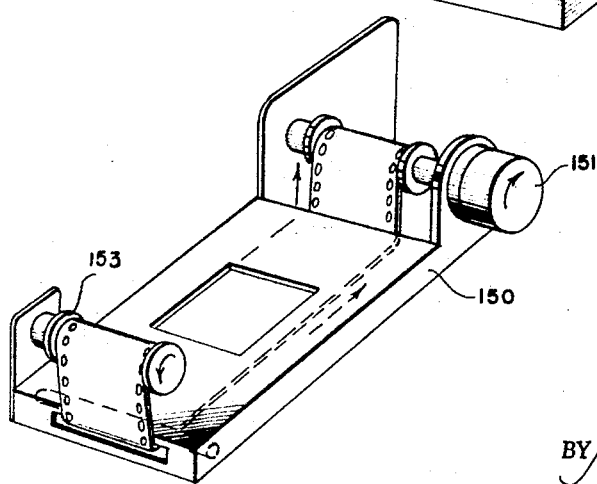
INVENTOR
KURT H. HOPPMANN
BY Semmes & Semmes
ATTORNEYS May 20, 1969      K. H. HOPPMANN      3,445,159

MULTIMEDIA PROJECTION SYSTEM

Filed March 1, 1966

INVENTOR
KURT H. HOPPMANN

BY Semmes & Semmes
ATTORNEYS

United States Patent Office 3,445,159
Patented May 20, 1969

3,445,159
MULTIMEDIA PROJECTION SYSTEM
Kurt H. Hoppmann, Falls Church, Va., assignor to Hoppmann Corporation, Alexandria, Va., a corporation of Virginia
Filed Mar. 1, 1966, Ser. No. 530,929
Int. Cl. G03b 21/26
U.S. Cl. 353—35        3 Claims

ABSTRACT OF THE DISCLOSURE

A multimedia projection device having a plurality of optically aligned stage plates for separately supporting film strips, slides, or other projection media to be projected as a composite image. A movable first stage projection lens support is provided having separate film strips and slide projection lenses mounted thereon. By movement of the support, either lens may be positioned into the optical path depending on whether slides or film strips are to be projected.

---

The present application relates to projection systems, particularly a system where a plurality of optically aligned stage plates are provided for separately supporting film strip, slide and other projection media to be projected as a composite image.

The system is characterized in that intermediate accessibility is provided uniquely on the second stage plate. Also, the first stage plate and its adjacent projection lenses are adapted for simultaneous or selective viewing of a plurality of variously sized film media, for example, 2 by 2 slides, 3¼ by 4 slides and film strips.

Numerous previous inventors have devised systems for the projection of composite images through transparent slides or opaque materials presented intermediate the light source and an ultimate projection lens. In this latter category, the most pertinent art concerns devices for the projection of lecture materials or bowling scores as written upon a conventional bowling score sheet. However, none of these devices are adapted to project variously sized film strip media simultaneously with either opaque or transparent film media supported above the second stage plate. According to the present invention, any size slide in any commercial slide mount, any single frame 35 mm. film strip and any transparency up to 10 by 10 inches can be projected simultaneously within an extremely versatile and economical unit. As a slide or film strip is placed on the first stage plate, it projects on a screen and simultaneously on the second stage plate. Its enlarged image appears on the second stage plate in sharp focus, clearly visible and for all projection purposes it can be treated like a transparency. Thus, it may be edited by grease pencil or opaque material. Also, transparent images can be superimposed on the second stage plate image to provide new teaching techniques.

Accordingly, it is an object of invention to provide a projection system wherein a plurality of film media may be simultaneously projected through the same optical path.

Another object of invention is to provide a multimedia projection system, having individual projection lenses suited to each type of slide and film strip media.

Yet, an additional object of invention is to provide within a single projection system a plurality of stage plates and projection lenses adapted to the simultaneous projection of all types of viewing media.

Figure 4:
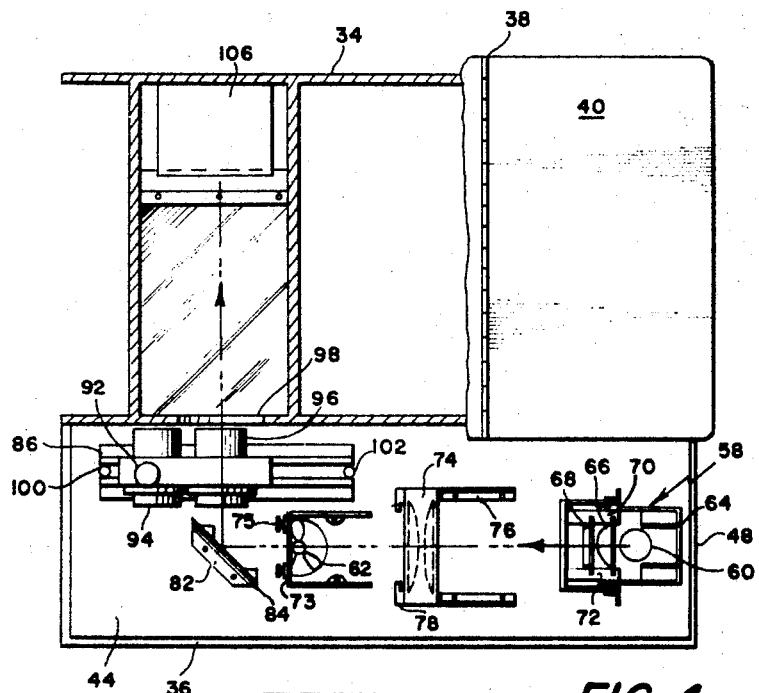
Figure 5:
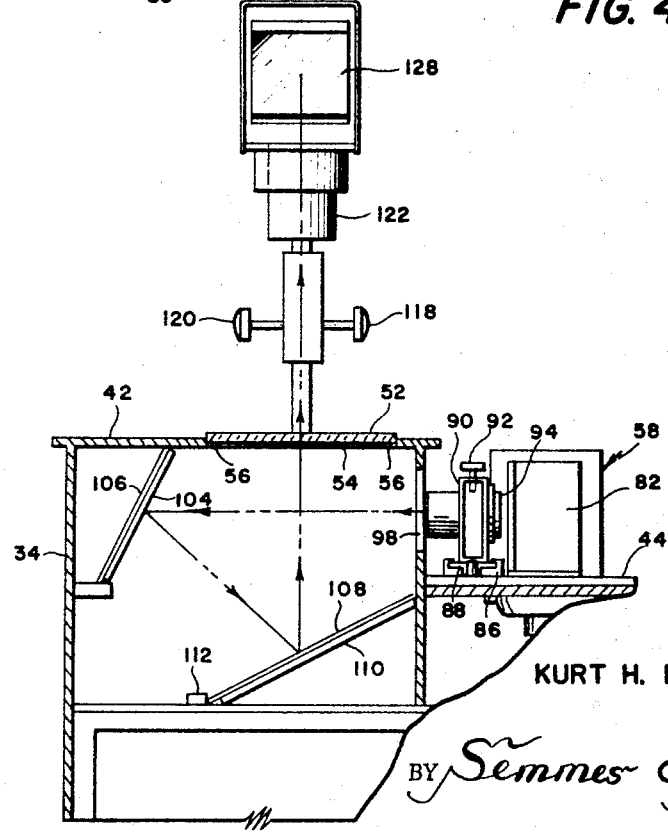
Figure 13:
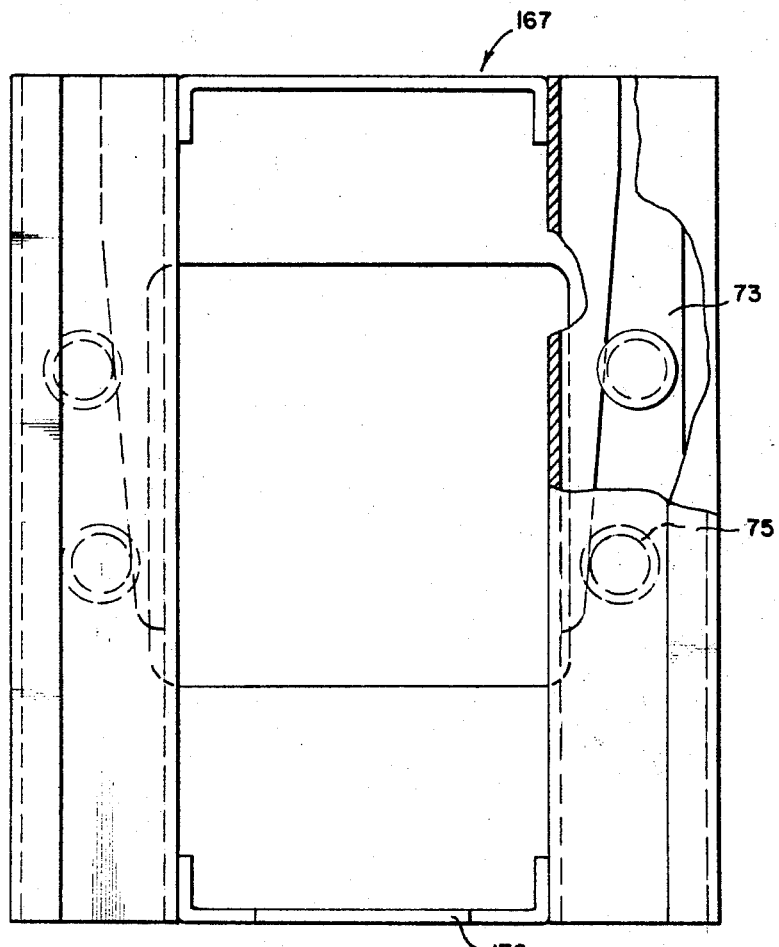
Figure 12:
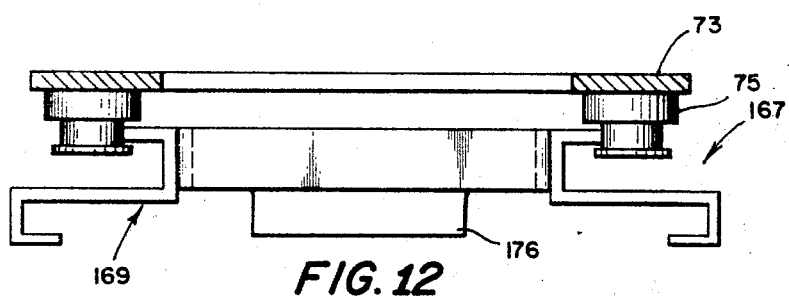

Additional objects of invention will become apparent from the ensuing specification and attached drawings, wherein:

FIG. 1 is a perspective of the projection system;

FIG. 2 is a side elevation thereof;
FIG. 3 is a front elevation;
FIG. 4 is a top plan, partially fragmentary, with the second stage projection lens removed and covers for the light source removed;
FIG. 5 is a sectional view through the front of the housing, showing the optical path through the projection lenses and stage plates;
FIG. 6 is an enlarged perspective of a rotatable first stage projection lens plate for positioning any one of three projection lenses within the optical path;
FIG. 7 is a schematic view, defining the optical path from the light source through the various collector and collimator condensers, through the first stage plate and projection lenses and through the second stage plate and second stage projection lens onto a viewing screen;
FIG. 8 is an enlarged perspective of an individual slide magazine with tensioning device;
FIG. 9 is a magazine used for positioning a 3¼ by 4 inch slide by means of brackets;
FIG. 10 is an enlarged perspective of a 2 by 2 slide with feeder magazine and selector switch;
FIG. 11 is a perspective of a film strip magazine with turning knob for moving of film;
FIG. 12 is a top plan, showing a 3¼ by 4 inch slide adaptor mounted on the 2 x 2 stage plate; and
FIG. 13 is a front elevation of the 3¼ x 4 slide adaptor defining a channel for support of a 3¼ x 4 magazine.

In FIG. 1 multimedia projector generally designated as 20 is illustrated as comprising a housing 22 mounted upon upstanding legs 24, 26 and 28, having horizontal supports 30 and 32 and individual ball type casters 50. Side panels 34 and 36, rear panel 48 and front panel 46 may be mounted upon the upstanding legs. Main top cover 42 is provided for support of the second stage plate or transparency stage 52. A Fresnel lens 54 may be mounted beneath transparency stage 52 by means of bracket 56. Side top cover 44 is provided for support of the light source and the first stage, transparency, slide and film strip 2 x 2 stage plate 73, secured by knurled thumb screws 75 or the like.

By using 3¼ x 4 adaptor 167 illustrated in FIG. 12, 3¼ x 4 slides can be alternatively projected through the 2 x 2 aperture. This provides a wider magnification of certain portions of the 3¼ x 4 slide. Otherwise, 2 x 2 magazines 140, 144 and 146 can be supported at stage plate 73 for conventional magnification through the 2 x 2 projection lens.

In FIG. 1 light source housing 58 is shown aligned with hood 80, primary mirror support 82 and first stage projection lens support 90. In FIG. 4 cover 58 and hood 82 are removed for illustration of the positioning of lamp 60 with respect to airflow ducts 62, and optically aligned collector condenser 66 and heat filter 68 mounted within brackets 70 and 72. A conversion condenser 74 may be mounted in brackets 76 and have at its forward end two 3¼ by 4 inch slide supports 78. One or more fan cooling elements 62 may be positioned adjacent the light source and condenser elements. The 2 x 2" and film strip first stage 73, as illustrated in FIG. 2 is positioned intermediate hood 80 and primary mirror support bracket 82 and is adjusted for support of the various film strip and slide magazine elements illustrated in FIGS. 8–11. The positioning of this 2 x 2" stage apart from the 3¼ x 4" stage enables most efficient and fullest use of the light cone projected through the condenser. This is believed to be a unique capability in projection devices. The primary front surface reflecting mirror 84 is positioned intermediate the first stage 73 and the first stage projection lens support 90. Lens support 90 is provided with shoe 88 which fits within track 86 and by grasping handle 92 the lens support 90 may be slid within track 86 so as to position either two by two projection lens 96 or the 3¼ by 4 inch projection lens 94 within the optical path. Studs 100 and 102 may be positioned at opposed ends of track 86 to limit longitudinal movement of lens support 90. Aperture 98 is provided in the side of the housing 22 and, as illustrated in FIG. 5, the optical path extends through the first stage projection lenses to a secondary front surface reflecting mirror 104 mounted on bracket 106, thence to a third front surface reflecting mirror 108 supported by means of bracket 110 and abutting strut 112, through the Fresnel lens 54 and second stage plate 52, through the second stage projection lens 122, onto mirror 128 and thence onto a viewing screen.

Second stage projection lens 122 is mounted by means of collar 117 and support arm 124, removably secured to upstanding post 114. Post 114 is secured in the housing top 42 by means of base flange 116. Adjacent top 40 may be hinged at 38 to provide access to a 3 cubic foot capacity storage compartment for storing slides, film strips, spare parts and accessories.

The second stage projection lens 122 is vertically secured on post 114 by tightening of knurled set screws 118 and 120.

A fourth front surface reflecting mirror 128 is mounted above lens 122 and within hood 126 and, as illustrated in FIG. 7, the optical path extends from this mirror onto a viewing screen. Control knob 118 is provided for elevating the screen image from 0 to 30° above horizontal.

In the FIG. 6 modification, a 2 by 2 lens 94′, film strip projection lens 96′ and 3¼ by 4 inch projection lens 136 are secured within support disc 134 which is rotatably mounted by means of stud 138 on bracket 132. According to this modification, either one of these projection lenses may be positioned in the optical path intermediate of first reflecting mirror 84 and the secondary reflecting mirror 104.

In FIGS. 8–11 there are illustrated the various slide magazines and adaptors for positioning variously sized slides, film strips and the like. In FIG. 8 there is shown an individual slide magazine 140 with tensioning device 142. FIG. 9 depicts a magazine 144 used for positioning a ¾ by 4 inch slide by means of bracket 145. FIG. 10 shows a 2 by 2 slide with feeder magazine 146 and selector switch 148. FIG. 11 depicts a film strip magazine 150 having turning knob 151 for moving of film strip 153. FIG. 12 is an enlarged top plan showing a ¾ by 4 inch slide adaptor 167 mounted on the 2 by 2 stage plate 73 and FIG. 13 is a front elevation of the 3¼ by 4 inch slide adaptor 167 defining a channel 169 for support of the ¾ by 4 inch magazine 144 illustrated in FIG. 9.

In FIGS. 1, 2 and 3 there are illustrated the means for supporting the transparency roll 174 on top of the transparency stage plate 52. The transparency rolls 174 may be either clear acetate for marking by grease pencil or may have any type of opaque indicia imprinted thereon for casting a silhouette or coloring onto the composite image received on the stage plate and then projected through the second stage projection lens. Pairs of brackets 156 and 158 are secured to the housing for supporting idler rollers 162 and 164 and collecting rollers 156 and 158. Hand wheels 166 and 168 may be employed for cranking the transparency roll 174 over the stage plate 52. The entire device may be regulated by turning on blower switch 170 and lamp switch 172 which may be arranged so that the lamp 60 cannot be actuated until blower 62 is working.

As will be apparent, the present apparatus provides a multiplicity of projection capabilities within one instrument. As a result, transparencies, film strips and slides may be projected simultaneously and edited as a composite image. All types of transparencies can be superimposed on the slides and film strips, for example when a slide is projected from stage plate 78 or 73, a transparency roll 174 or a 10 by 10 can be placed on stage plate 52 and its image as well as that of the slide will be clearly visible on the viewing screen. Thus, low cost color slides and film strips now become available for overhead projection techniques. Any detail of these projected images is accessible on the transparency stage plate for emphasizing adding, subtracting or altering in any desirable way.

Manifestly, various modifications and structures may be undertaken without departing from the spirit and scope of invention, as defined in the subjoined claims.

I claim:
1. A multimedia projection system with intermediate accessibility comprising:
 (A) a projector housing with an interiorly mounted first stage projection lens;
  (i) said first stage projection lens including separate film strips and slide projection lenses, together with a movable support for positioning either lens into an optical path, either lens being positionable into said optical path, depending on whether slides or film strips are to be projected and an overhead second stage projection lens supported above said housing;
 (B) a light source supported in said housing;
 (C) a first stage plate mounted intermediate said light source and said first stage projection lens for supporting projection media, and including:
  (i) a first bracket for supporting a large viewing slide, and;
  (ii) a second bracket positioned apart from said first bracket and adjacent said first stage mirror for supporting a smaller viewing slide;
 (D) a second stage plate secured in the top of said housing;
 (E) at least one first stage mirror positioned within said housing intermediate said first and second stage plates and defining an optical path from said first stage plate through said second stage plate;
 (F) a second stage mirror supported adjacent said second stage projection lens and defining an optical path from said second stage plate through said projection lens; and
 (G) means movably mounted on transparent film above said second stage plate.

2. A multimedia projection system as in claim 1, said first stage projection lens including:
 a rotatably mounted lens support piece, having at least three separate projection lenses rotatable into the optical path, a first of said lenses being adapted for projection of film strip media, a second of said projection lenses being adapted for projection of 2 x 2 slides and a third of said projection lenses being actuable for projection of 3¼ by 4 inch slides.

3. A multimedia projection system with intermediate accessibility comprising:
 (A) a projector housing with an interiorly mounted first stage projection lens having a separate film strip lens and a separate slide lens and an overhead second stage projection lens supported above said housing, said first stage projection lens including:
  (i) a track mounted on the top of said housing;
  (ii) a lens projection support piece having a bottom shoe member engaging said track and selectively supporting either said projection lenses in horizontal alignment with said first stage mirror and said interiorly mounted mirrors;
 (B) a light source supported in said housing;
 (C) a first stage plate mounted intermediate said light source and said first stage projection lens for supporting in projection media and further including:
  (i) a first bracket positioned adjacent said light source for supporting a large viewing slide; and
  (ii) a second bracket positioned adjacent said first stage mirror for supporting a smaller viewing slide;
 (D) a second stage plate secured in the top of said housing;

(E) a first stage mirror positioned within said housing intermediate said first stage plate and said first stage projection lens;
(F) a plurality of first stage front surface reflecting mirrors mounted within said housing intermediate said first stage projection lens and said second stage plate, defining an optical path from said first stage projection lens through said second stage plate;
(G) a second stage mirror supported in said housing above said second stage projection lens and defining an optical path from said projection lens; and
(H) a movably mounted transparent film supported on said housing above said second stage plate.

References Cited

UNITED STATES PATENTS

| | | | |
|---|---|---|---|
| 2,543,561 | 2/1951 | Tracy | 88—24 |
| 2,742,815 | 4/1956 | Dietrich et al. | 88—24 |
| 3,060,797 | 10/1962 | Andreas | 88—24 |
| 3,124,035 | 3/1964 | Lucas | 88—24 |
| 3,285,126 | 11/1966 | Lucas | 88—240 |
| 3,366,005 | 1/1968 | Benedict | 88—240 |

FOREIGN PATENTS 257,518  4/1964  Netherlands.

NORTON ANSHER, *Primary Examiner.*

RICHARD M. SHEER, *Assistant Examiner.*

U.S. Cl. X.R.

353—37, 44, 100